US012755491B2

(12) United States Patent
Dewji et al.

(10) Patent No.: US 12,755,491 B2
(45) Date of Patent: Oct. 6, 2026

(54) SYSTEMS AND METHODS FOR MODELING A HUMAN RESPIRATORY TRACT

(71) Applicant: Georgia Tech Research Corporation, Atlanta, GA (US)

(72) Inventors: Shaheen Azim Dewji, Atlanta, GA (US); Mauricio Eduardo Tano Retamales, Atlanta, GA (US); Ignacio Rodrigo Bartol, Atlanta, GA (US); Martin Graffigna Palomba, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 134 days.

(21) Appl. No.: 18/954,733

(22) Filed: Nov. 21, 2024

(65) Prior Publication Data

US 2025/0166305 A1 May 22, 2025

Related U.S. Application Data

(60) Provisional application No. 63/601,958, filed on Nov. 22, 2023.

(51) Int. Cl.
*G06T 17/20* (2006.01)
*G06T 19/20* (2011.01)

(52) U.S. Cl.
CPC ............ *G06T 17/205* (2013.01); *G06T 19/20* (2013.01)

(58) Field of Classification Search
CPC ........ G06T 17/20; G06T 17/205; G06T 19/20
See application file for complete search history.

(56) References Cited

U.S. PATENT DOCUMENTS

| | | | | |
|---|---|---|---|---|
| 11,861,804 | B1 * | 1/2024 | Singh | G06T 19/20 |
| 2004/0059263 | A1 * | 3/2004 | DeVore | A61B 5/1076 600/587 |
| 2019/0325645 | A1 * | 10/2019 | Guendel | A61B 34/10 |
| 2019/0340838 | A1 * | 11/2019 | Gluhovsky | A61B 5/0044 |

(Continued)

OTHER PUBLICATIONS

Ang, K. K. et al. Randomized phase III trial of concurrent accelerated radiation plus cisplatin with or without cetuximab for stage III to IV head and neck carcinoma: RTOG 0522. J. Clin. Oncol. 32, 2940-2950, DOI: 10.1200/jco.2013.53.5633 (2014).

(Continued)

*Primary Examiner* — Charles Tseng
(74) *Attorney, Agent, or Firm* — Meunier Carlin & Curfman LLC

(57) ABSTRACT

A method for modeling a human respiratory tract. The method includes receiving a number of images, wherein each of the number of images include at least a portion of a human respiratory tract, generating, based on the number of images, a 3D model of at least a portion of the human respiratory tract, wherein the 3D model includes an uncapped endpoint of the human respiratory tract, and automatically capping the endpoint within the 3D model by identifying, using a computer-implemented algorithm, the endpoint of the human respiratory tract within the 3D model, generating a 3D model of a shape, aligning the 3D model of the shape with the endpoint by positioning a center of the 3D model of the shape at a centroid corresponding to the endpoint, and merging the 3D model of the shape with the 3D model.

19 Claims, 6 Drawing Sheets

(56) References Cited

U.S. PATENT DOCUMENTS

| | | | | |
|---|---|---|---|---|
| 2020/0253727 | A1* | 8/2020 | Lin | A61L 27/18 |
| 2021/0233308 | A1* | 7/2021 | Barasofsky | G06T 17/20 |
| 2021/0256875 | A1* | 8/2021 | Mosier | B29C 64/393 |
| 2023/0201504 | A1 | 6/2023 | Varga | |
| 2023/0302236 | A1 | 9/2023 | Longest et al. | |
| 2023/0368398 | A1 | 11/2023 | Figueroa-Alvarez et al. | |
| 2024/0001619 | A1* | 1/2024 | Mccutcheon | B22F 10/80 |
| 2024/0070883 | A1* | 2/2024 | Soper | A61B 90/361 |
| 2025/0124653 | A1* | 4/2025 | Wolfensparger | G06T 7/20 |

OTHER PUBLICATIONS

Arsalanloo, A. et al. A computational approach to understand the breathing dynamics and pharmaceutical aerosol transport in a realistic airways. Adv. Powder Technol. 33, 103635, DOI: 10.1016/j.apt.2022.103635 (2022).

Atzeni, C., Lesma, G., Dubini, G. & et al. Computational fluid dynamic models as tools to predict aerosol distribution in tracheobronchial airways. Sci. Reports 11, 1109, DOI: 10.1038/s41598-020-80241-0 (2021).

Bellamy, M. B. et al. Comparison of monoenergetic photon organ dose rate coefficients for stylized and voxel phantoms submerged in air. Radiat. protection dosimetry 172, 367-374 (2016).

Bolch, W. E., Farfan, E. B., Huh, C., Huston, T. E. & Bolch, W. E. Influences of parameter uncertainties within the icrp 66 respiratory tract model: particle deposition. Heal. physics 81, 378-394 (2001).

Bosch, W. R., Straube, W. L., Matthews, J. W. & Purdy, J. A. Head-neck cetuximab, DOI: 10.7937/K9/TCIA.2015.7AKGJUPZ (2015).

Bowes III, S. M. & Swift, D. L. Deposition of inhaled particles in the oral airway during oronasal breathing. Aerosol Sci. Technol. 11, 157-167 (1989).

Cercos-Pita, J. L., Cal, I. R., Duque, D. & de Moreta, G. S. Nasal-geom, a free upper respiratory tract 3d model reconstruction software. Comput. Phys. Commun. 223, 55-68 (2018).

Cheng, Y.-S., Zhou, Y. & Chen, B. T. Particle deposition in a cast of human oral airways. Aerosol Sci. & Technol. 31, 286-300 (1999) .

Clark, K. et al. The cancer imaging archive (TCIA): Maintaining and operating a public information repository. J. Digit. Imaging 26, 1045-1057, DOI: 10.1007/s10278-013-9622-7 (2013).

Cuddihy, R. G. et al. Characteristics of radioactive particles released from the chernobyl nuclear reactor. Environ. Science & technology 23, 89-95 (1989).

Desai, S. et al. Chest imaging representing a COVID-19 positive rural u.s. population. Sci. Data 7, DOI: 10.1038/s41597-020-00741-6 (2020).

Desai, S. et al. Chest imaging with clinical and genomic correlates representing a rural covid-19 positive population [data set], DOI: https://doi.org/10.7937/tcia.2020.py71-5978 (2020).

Dewji, S. A., Bales, K., Griffin, K., Lee, C. & Hiller, M. Age-dependent comparison of monoenergetic photon organ and effective dose coefficients for pediatric stylized and voxel phantoms submerged in air. Phys. Medicine & Biol. 63, 175019 (2018).

Eslick, E. M. et al. Ct ventilation as a functional imaging modality for lung cancer radiotherapy (ct-vs-pet-ventilationimaging), DOI: 10.7937/3PPX-7S22 (2022).

Eslick, E. M. et al. CT ventilation imaging derived from breath hold CT exhibits good regional accuracy with galligas PET. Radiother. Oncol. 127, 267-273, DOI: 10.1016/j.radonc.2017.12.010 (2018).

Feng, Y. et al. An in silico inter-subject variability study of extra-thoracic morphology effects on inhaled particle transport and deposition. J. Aerosol Sci. 123, 185-207 (2018).

Feng, Y., Xu, Z. & Haghnegandar, A. Computational Fluid-Particle Dynamics Modeling for Unconventional Inhaled Aerosols in Human Respiratory Systems, book section 3, 49-84 (InTech Rijeka, 2016).

Fresconi, F. E. & Prasad, A. K. Secondary velocity fields in the conducting airways of the human lung. J. Biomech. Eng. 129, 722-732, DOI: 10.1115/1.2768374 (2007).

Garcia-Uceda, A., Selvan, R., Saghir, Z., Tiddens, H. A. & de Bruijne, M. Automatic airway segmentation from computed tomography using robust and efficient 3-d convolutional neural networks. Sci. Reports 11, 1-15 (2021).

Graham, M., Gibbs, J. & Higgins, W. Robust system for human airway-tree segmentation, vol. 6914 of Medical Imaging (SPIE, 2008).

Guilmette, R. A., Johnson, N. F., Newton, G. J., Thomassen, D. G. & Yeh, H. C. Risks from radon progeny exposure: What we know, and what we need to know. Annu. Rev. PharmacoL ToxicoL 31, 569-601, DOI:10.1146/annurev.pa.31.040191.003033 (1991).

Hiller, M. & Dewji, S. A. Comparison of monoenergetic photon organ dose rate coefficients for the female stylized and voxel phantoms submerged in air. Radiat. protection dosimetry 175, 336-343 (2017).

Hofmann, W. Modelling inhaled particle deposition in the human lung—a review. J. Aerosol Sci. 42, 693-724, DOI:10.1016/j.jaerosci.2011.05.007 (2011).

ICRP. Human respiratory tract model for radiological protection icrp publication 66. Oxford: Pergamon (1994).

ICRP. Occupational intakes of radionuclides: Part 3 icrp publication 137. Oxford: Pergamon (2017).

Igarashi, Y. et al. A review of cs-bearing microparticles in the environment emitted by the fukushima dai-ichi nuclear power plant accident. J. environmental radioactivity 205, 101-118 (2019).

Inthavong, K., Ge, Q. J., Li, X. D. & Tu, J. Y. Detailed predictions of particle aspiration affected by respiratory inhalation and airflow. Atmospheric Environ. 62, 107-117, DOI: 10.1016/j.atmosenv.2012.07.071 (2012).

Inthavong, K., Wen, J., Tu, J. & Tian, Z. From ct scans to cfd modelling—fluid and heat transfer in a realistic human nasal cavity. Eng. AppL Comput. Fluid Mech. 3, 321-335, DOI: 10.1080/19942060.2009.11015274(2009).

Irving, B., Todd-Pokropek, A. & Taylor, P. Airway segmentation and analysis from computed tomography. Lung Imaging Comput. Aided Diagn. 151 (2011).

Islam, M. S., Saha, S. C., Gemci, T. & et al. Euler-lagrange prediction of diesel-exhaust polydisperse particle transport and deposition in lung: Anatomy and turbulence effects. Sci. Reports 9, 12423, DOI: 10.1038/s41598-019-48753-6 (2019).

Jayaraju, S. T., Brouns, M., Lacor, C., De Mey, J. & Verbanck, S. Effects of tracheal stenosis on flow dynamics in upper human airways. In ECCOMAS CFD 2006: Proceedings of the European Conference on Computational Fluid Dynamics, Egmond aan Zee, The Netherlands, Sep. 5-8, 2006 (Citeseer, 2006).

Jenjaroenpun, P. et al. Two SARS-COV-2 genome sequences of isolates from rural u.s. patients harboring the d614g mutation, obtained using nanopore sequencing. Microbiol. Resour. Announc. 10, DOI: 10.1128/mra.01109-20 (2021).

Jeong, S.-J., Kim, W.-S. & Sung, S.-J. Numerical investigation on the flow characteristics and aerodynamic force of the upper airway of patient with obstructive sleep apnea using computational fluid dynamics. Med. Eng. & Phys. 29, 637-651, DOI: 10.1016/j.medengphy.2006.08.017 (2007).

Jordan, P. et al. Pediatric chest/abdomen/pelvic ct exams with expert organ contours (pediatric-ct-seg), DOI: 10.7937/TCIA.X0H0-1706 (2021).

Jordan, P. et al. Pediatric chest-abdomen-pelvis and abdomen-pelvis CT images with expert organ contours. Med. Phys. 49, 3523-3528, DOI: 10.1002/mp.15485 (2022).

Kelly, J. T., Asgharian, B., Kimbell, J. S. & Wong, B. A. Particle deposition in human nasal airway replicas manufactured by different methods. part i: Inertial regime particles. Aerosol science technology 38, 1063-1071 (2004).

Khazov, Y. & Im, A. R. Decay radiation results (i131). Nucl. Data Sheets 107, 2715 (2006).

Kim, C. H. et al. Icrp publication 145: adult mesh-type reference computational phantoms. Annals ICRP 49, 13-201 (2020).

Kim, Y. H. et al. Computational investigation of particle penetration and deposition pattern in a realistic respiratory tract model from different types of dry powder inhalers. Int. J. Pharm. 612, 121293, DOI: 10.1016/j.ijpharm.2021.121293 (2022).

(56) References Cited

OTHER PUBLICATIONS

Kleinstreuer, C. & Zhang, Z. Airflow and particle transport in the human respiratory system. Annu. Rev. Fluid Mech. 42, 301-334, DOI: 10.1146/annurev-fluid-121108-145453 (2010).
Koblinger, L. Analysis of human lung morphometric data for stochastic aerosol deposition calculations. Phys. Medicine & Biol. 30, 541 (1985).
Koullapis, P. et al. Regional aerosol deposition in the human airways: The siminhale benchmark case and a critical assessment of in silico methods. Eur. J. Pharm. Sci. 113, 77-94, DOI: 10.1016/j.ejps.2017.09.003 (2018).
Kundu, D. & Panchagnula, M. V. Asymmetric lung increases particle filtration by deposition. Sci. Reports 13, DOI: 10.1038/s41598-023-36176-3 (2023).
Langtry, R. B. & Menter, F. R. Correlation-based transition modeling for unstructured parallelized computational fluid dynamics codes. AIAA journal 47, 2894-2906 (2009).
Li, A. & Ahmadi, G. Dispersion and deposition of spherical particles from point sources in a turbulent channel flow. Aerosol science technology 16, 209-226 (1992).
Li, P. et al. A large-scale ct and pet/ct dataset for lung cancer diagnosis, DOI: 10.7937/TCIA.2020.NNC2-0461 (2020).
Lin, C.-L., Tawhai, M. H., McLennan, G. & Hoffman, E. A. Characteristics of the turbulent laryngeal jet and its effect on airflow in the human intra-thoracic airways. Respir. PhysioL & NeurobioL 157, 295-309, DOI: 10.1016/j.resp.2007.02.006 (2007).
Liu, H., Ma, S., Hu, T. & Ma, D. Computational investigation of flow characteristics and particle deposition patterns in a realistic human airway model under different breathing conditions. Respir. Physiol. & Neurobiol. 314, 104085, DOI: 10.1016/j.resp.2023.104085 (2023).
Lo, P. et al. Extraction of airways from ct (exact'09). IEEE Transactions on Med. Imaging 31, 2093-2107, DOI: 10.1109/TMI.2012.2209674 (2012).
Longest, P. W. & Holbrook, L. T. In silico models of aerosol delivery to the respiratory tract—development and applications. Adv. Drug Deliv. Rev. 64, 296-311, DOI: 10.1016/j.addr.2011.05.009 (2012).
Longest, P. W., Hindle, M., Choudhuri, S. D. & Xi, J. Comparison of ambient and spray aerosol deposition in a standard induction port and more realistic mouth-throat geometry. J. Aerosol Sci. 39, 572-591 (2008).
Longest, P. W., Tian, G., Delvadia, R. & Hindle, M. Development of a stochastic individual path (sip) model for predicting the deposition of pharmaceutical aerosols: Effects of turbulence, polydisperse aerosol size, and evaluation of multiple lung lobes. Aerosol Sci. TechnoL 46, 1271-1285 (2012).
Matida, E., Finlay, W. H., Lange, C. & Grgic, B. Improved numerical simulation of aerosol deposition in an idealized mouth-throat. J. aerosol science 35, 1-19 (2004).
Mauroy, B., Filoche, M., Weibel, E. R. & Sapoval, B. An optimal bronchial tree may be dangerous. Nature 427, 633-636, DOI: 10.1038/nature02287 (2004).
Nasab, M. K., Motavalli, L. R. & Hakimabad, H. M. Internal dosimetry of inhaled iodine-131. J. Environ. Radioact. 181, 62-69, DOI: 10.1016/j.jenvrad.2017.10.013 (2018).
O' Rourke, P. J., Zhao, P. P. & Snider, D. A model for collisional exchange in gas/liquid/solid fluidized beds. Chem. Eng. Sci. 64, 1784-1797, DOI: 10.1016/j.ces.2008.12.014 (2009).
Paquet, F. et al. Icrp publication 130: Occupational intakes of radionuclides: Part 1. Annals ICRP 44, 5-188, DOI: 10.1177/0146645315577539 (2015).
Rahimi-Gorji, M., Pourmehran, 0., Gorji-Bandpy, M. & Gorji, T. B. Cfd simulation of airflow behavior and particle transport and deposition in different breathing conditions through the realistic model of human airways. J. Mol. Liq. 209, 121-133, DOI: 10.1016/j.molliq.2015.05.031 (2015).
Rahman, M., Zhao, M., Islam, M. S., Dong, K. & Saha, S. C. Numerical study of nano and micro pollutant particle transport and deposition in realistic human lung airways. Powder Technol. 402, 117364, DOI: 10.1016/j.powtec.2022.117364 (2022).
Rana, S., Kharbanda, O. & Agarwal, B. Influence of tongue volume, oral cavity volume and their ratio on upper airway: A cone beam computed tomography study. J. Oral Biol. Craniofacial Res. 10, 110-117 (2020).
Reza, T., Roohollah, R., Mohammad, S. V. & Goodarz, A. Modeling the transient absorption of particulate drugs in the human upper airways. J. Heat Mass Transf Res. Semnan Univ. 7, DOI: 10.22075/jhmtr.2020.20957.1295 (2020).
Roache, P. J., Ghia, K. N., & White, F. M. (1986). Editorial Policy Statement on the Control of Numerical Accuracy. Journal of Fluids Engineering, 108(1), 2. doi:10.1115/1.3242537, 1986.
Salbu, B. & Lind, 0. C. Radioactive particles released into the environment from nuclear events. In Actinide Nanoparticle Research, 335-359 (Springer, 2011).
Sato, T. et al. Particle and heavy ion transport code system, phits, version 2.52. J. Nucl. Sci. TechnoL 50, 913-923 (2013).
Satou, Y., Sueki, K., Sasa, K., Adachi, K. & Igarashi, Y. First successful isolation of radioactive particles from soil near the fukushima daiichi nuclear power plant. Anthropocene 14,71-76 (2016).
Shang, Y., Dong, J., Tian, L., Inthavong, K. & Tu, J. Detailed computational analysis of flow dynamics in an extended respiratory airway model. Clin. Biomech. 61, 105-111, DOI: 10.1016/j.clinbiomech.2018.12.006 (2019).
Shariaty, F., Hosseinlou, S. & Rud, V. Y. Automatic lung segmentation method in computed tomography scans. In Journal of Physics: Conference Series, vol. 1236, 012028 (IOP Publishing, 2019).
Shi, H., Kleinstreuer, C. & Zhang, Z. Laminar airflow and nanoparticle or vapor deposition in a human nasal cavity model. J. Biomech. Eng. 128, 697-706, DOI: 10.1115/1.2244574 (2006).
Shi, H., Kleinstreuer, C. & Zhang, Z. Modeling of inertial particle transport and deposition in human nasal cavities with wall roughness. J. Aerosol Sci. 38, 398-419, DOI: 10.1016/j.jaerosci.2007.02.002 (2007).
Siemens Digital Industries Software. Simcenter star-ccm+, version 2021.1 (2021).
Silverman, L. et al. Air flow measurements on human subjects with and without respiratory resistance at several work rates. Arch. Indust. Hyg. & Occup. Med. 3, 461-78 (1951).
Slater, J.W., Dudek, J. C. & Tatum, K. E. The nparc alliance verification and validation archive. In 2000 Fluids Engineering Summer Conference, No. NASA/TM-2000-209946 in ASME 2000-FED-11233 (2000).
Software, S. D. I. Simcenter STAR-CCM+ User Guide, version 2021.1. In Adaptive Mesh Refinement for Overset Meshes, 3067-3070 (Siemens, 2021). https://docs.sw.siemens.com/documentation/external/PL20200805113346338/en-US/userManual/userguide/html/STARCCMP/GUID-28A739CF-6DE2-4D87-B582-E390B522011C.html#/ (Siemens, 2021).
Szoke, I. et al. 3d-modelling of radon-induced cellular radiobiological effects in bronchial airway bifurcations: Direct versus bystander effects. Int. J. Radiat. Biol. 88, 477-492, DOI: 10.3109/09553002.2012.676229 (2012).
Taherian, S., Rahai, H., Lopez, S. & et al. Evaluation of human obstructive sleep apnea using computational fluid dynamics. Commun. Biol. 2,423, DOI: 10.1038/s42003-019-0668-z (2019).
Talaat, K., Hecht, A. & Xi, J. A comparison of cfpd, compartment, and uniform distribution models for radiation dosimetry of radionuclides in the lung. J. Radiol. Prot. DOI: 10.1088/1361-6498/abf548 (2021).
Talaat, K., Xi, J., Baldez, P. & Hecht, A. Radiation dosimetry of inhaled radioactive aerosols: Cfpd and mcnp transport simulations of radionuclides in the lung. Sci. Reports 9, DOI: 10.1038/s41598-019-54040-1 (2019).
Wallbridge, S., Banford, A. & Azapagic, A. Life cycle environmental impacts of decommissioning magnox nuclear power plants in the UK. The Int. J. Life Cycle Assess. 18, 990-1008, DOI: 10.1007/s11367-012-0534-4 (2012).
Wang, A., Tam, T. C. C., Poon, H. M., Yu, K.-C. & Lee, W.-N. Naviairway: a bronchiole-sensitive deep learning-based airway segmentation pipeline for planning of navigation bronchoscopy. arXiv preprint arXiv:2203.04294 (2022).

(56) References Cited

OTHER PUBLICATIONS

Weibel, E. R., Cournand, A. F. & Richards, D. W. Morphometry of the human lung, vol. 1 (Springer, 1963). Chapter—XI.
Weller, H. G., Tabor, G., Jasak, H. & Fureby, C. A tensorial approach to computational continuum mechanics using object-oriented techniques. Comput. physics 12, 620-631 (1998).
Xi, J. & Longest, P. Transport and deposition of micro-aerosols in realistic and simplified models of the oral airway. Annals biomedical engineering 35, 560-581(2007).
Xi, J., Longest, P. W. & Martonen, T. B. Effects of the laryngeal jet on nano- and microparticle transport and deposition in an approximate model of the upper tracheobronchial airways. J. Appl. Physiol. 104, 1761-1777 (2008).
Xu, S. et al. Speciation of radiocesium and radioiodine in aerosols from tsukuba after the fukushima nuclear accident. Environ. science & technology 49, 1017-1024 (2015).
Zankl, M. Adult male and female reference computational phantoms (icrp publication 110). Jpn. J. Heal. Phys. 45, 357-369 (2010).
Zeith, A. & Giorgou, E. Dangerous forces: the protection of nuclear power plants in armed conflict (2017).
Zhang, J. Recommendations to improve the public acceptance of nuclear environmental protection. In Springer Proceedings in Physics, 682-687, DOI: 10.1007/978-981-19-8899-8_66 (Springer Nature Singapore, 2023).
Zhang, Z. & Kleinstreuer, C. Airflow structures and nano-particle deposition in a human upper airway model. J. computational physics 198, 178-210 (2004).
Zhang, Z. & Kleinstreuer, C. Computational analysis of airflow and nanoparticle deposition in a combined nasal-oral-tracheobronchial airway model. J. Aerosol Sci. 42, 174-194, DOI: 10.1016/j.jaerosci.2011.01.001 (2011).
Zhang, Z. & Kleinstreuer, C. Transient airflow structures and particle transport in a sequentially branching lung airway model. Phys. Fluids 14, 862-880 (2002).
Zhou, Y., Sun, J. & Cheng, Y.-S. Comparison of deposition in the USP and physical mouth-throat models with solid and liquid particles. J. Aerosol Medicine Pulm. Drug Deliv. 24, 277-284, DOI: 10.1089/jamp.2011.0882 (2011).
Zhu, C. et al. Automatic 3d segmentation of human airway tree in ct image. In 2010 3rd International Conference on Biomedical Engineering and Informatics, vol. 1, 132-136, DOI: 10.1109/bmei.2010.5639658 (IEEE, 2010).

* cited by examiner

300

500

SYSTEMS AND METHODS FOR MODELING A HUMAN RESPIRATORY TRACT

CROSS-REFERENCE TO RELATED APPLICATIONS

This application claims the benefit of U.S. Provisional Patent Application No. 63/601,958, filed on Nov. 22, 2023, the entire contents of which are incorporated herein by reference.

STATEMENT REGARDING FEDERALLY SPONSORED RESEARCH OR DEVELOPMENT

This invention was made with government support under grant no. DOD-PRMRP W81XWH2110984 awarded by the Department of Defense and grant no. 1P01AI165380-01 awarded by the National Institute of Health. The government has certain rights in the invention.

BACKGROUND

The present disclosure relates generally to the field of 3-dimensional (3D) modeling, and more specifically to systems and methods for modeling a human respiratory tract.

Accurate 3D models of the human respiratory system (e.g., a respiratory tract, etc.) may be useful in many scenarios. For example, accurate 3D models of the human respiratory system may be used to (i) generate particle deposition profiles, (ii) to analyze drug delivery and inhalation therapies (e.g., in internal radiation dosimetry, in respiratory device design, etc.), (iii) to determine environmental health impacts (e.g., due to inhaled pollutants, etc.), and/or (iv) to determine particle behavior in an airway under varying conditions (e.g., in aerospace/high-altitude contexts, etc.).

SUMMARY

An implementation of the present disclosure is a method for modeling a human respiratory tract. The method includes receiving a number of images, wherein each of the number of images include at least a portion of a human respiratory tract, generating, based on the number of images, a 3D model of at least a portion of the human respiratory tract, wherein the 3D model includes an uncapped endpoint of the human respiratory tract, and automatically capping the endpoint within the 3D model by identifying, using a computer-implemented algorithm, the endpoint of the human respiratory tract within the 3D model, generating a 3D model of a shape, aligning the 3D model of the shape with the endpoint by positioning a center of the 3D model of the shape at a centroid corresponding to the endpoint, and merging the 3D model of the shape with the 3D model.

In some embodiments, the number of images include a computed tomography (CT) scan or a magnetic resonance imaging (MRI) image. In some embodiments, generating the 3D model includes generating a first 3D model of an upper respiratory tract comprising a nasal cavity and an oral cavity, generating a second 3D model of a lower respiratory tract comprising a trachea, and merging the first 3D model and the second 3D model to form the 3D model. In some embodiments, the second 3D model of the lower respiratory tract includes a fifth generation of bronchi. In some embodiments, generating the 3D model includes (i) executing a neural network trained on a number of volumetric chest CT scans or (ii) executing morphological-based algorithms. In some embodiments, the method further includes parameterizing the 3D model to identify at least two of (i) a length of a trachea, (ii) an average diameter of the trachea, (iii) a G0-to-G1 branching angle, or (iv) a volume of the 3D model. In some embodiments, the method includes modifying a mesh of the 3D model to increase or decrease a number of polygons in the mesh and applying a smoothing filter to the mesh. In some embodiments, identifying the endpoint of the human respiratory tract within the 3D model includes identifying, based on the 3D model, a centerline associated with a structure of the human respiratory tract and identifying an endpoint of the centerline. In some embodiments, identifying the endpoint of the centerline includes identifying a first endpoint of the centerline, identifying a second endpoint of the centerline, determining a first cross-sectional area associated with the structure of the human respiratory tract within the 3D model at the first endpoint, determining a second cross-sectional area associated with the structure of the human respiratory tract within the 3D model at the second endpoint, and labeling the first endpoint or the second endpoint based on comparing the first cross-sectional area to the second cross-sectional area. In some embodiments, automatically capping the endpoint within the 3D model includes producing a sealed 3D volume representing at least the portion of the human respiratory tract.

Another implementation of the present disclosure is a system for modeling a human respiratory tract. The system includes a processing circuit comprising a processor and memory, the memory having instructions stored thereon that, when executed by the processor, cause the processing circuit to receive a number of images, wherein each of the number of images include at least a portion of a human respiratory tract, generate, based on the number of images, a 3D model of at least a portion of the human respiratory tract, automatically identify, using a computer-implemented algorithm, an endpoint of the human respiratory tract within the 3D model, and automatically cap the endpoint within the 3D model.

In some embodiments, the number of images include a computed tomography (CT) scan or a magnetic resonance imaging (MRI) image. In some embodiments, generating the 3D model includes generating a first 3D model of an upper respiratory tract comprising a nasal cavity and an oral cavity, generating a second 3D model of a lower respiratory tract comprising a trachea, and merging the first 3D model and the second 3D model to form the 3D model. In some embodiments, the second 3D model of the lower respiratory tract includes a fifth generation of bronchi. In some embodiments, generating the 3D model includes (i) executing a neural network trained on a number of volumetric chest CT scans or (ii) executing morphological-based algorithms. In some embodiments, the instruction further cause the processing circuit to parameterize the 3D model to identify at least two of (i) a length of a trachea, (ii) an average diameter of the trachea, (iii) a G0-to-G1 branching angle, or (iv) a volume of the 3D model. In some embodiments, the instructions further cause the processing circuit to modify a mesh of the 3D model to increase a number of polygons in the mesh and apply a smoothing filter to the mesh. In some embodiments, automatically identifying the endpoint of the human respiratory tract within the 3D model includes identifying, based on the 3D model, a centerline associated with a structure of the human respiratory tract, identifying a first endpoint of the centerline, identifying a second endpoint of the centerline, determining a first cross-sectional area associated with the structure of the human respiratory tract within the 3D model at the first endpoint, determining a second cross-sectional area associated with the structure of the human respiratory tract within the 3D model at the second endpoint, and labeling the first endpoint or the second endpoint based on comparing the first cross-sectional area to the second cross-sectional area. In some embodiments, automatically capping the endpoint includes generating a 3D model of a shape, aligning the 3D model of the shape with the endpoint by positioning a center of the 3D model of the shape at a centroid corresponding to the endpoint, and merging the 3D model of the shape with the 3D model to produce a sealed 3D volume representing at least the portion of the human respiratory tract.

Another implementation of the present disclosure is a non-transitory computer-readable storage medium having instructions stored thereon that, when executed by a processor, cause the processor to receive a number of images comprising a computed tomography (CT) scan or a magnetic resonance imaging (MRI) image, wherein each of the number of images include at least a portion of a human respiratory tract, generating, based on the number of images, a 3D model of at least a portion of the human respiratory tract, wherein the 3D model includes an uncapped endpoint of the human respiratory tract, and automatically capping the endpoint within the 3D model by identifying, using a computer-implemented algorithm, the endpoint of the human respiratory tract within the 3D model by, identifying, based on the 3D model, a centerline associated with a structure of the human respiratory tract using a Fast Marching Method (FMM), and identifying an endpoint of the centerline as the endpoint of the human respiratory tract, generating a 3D model of a shape, aligning the 3D model of the shape with the endpoint of the human respiratory tract by positioning a center of the 3D model of the shape at a centroid corresponding to the endpoint of the human respiratory tract, and merging the 3D model of the shape with the 3D model to produce a sealed 3D volume representing at least the portion of the human respiratory tract.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
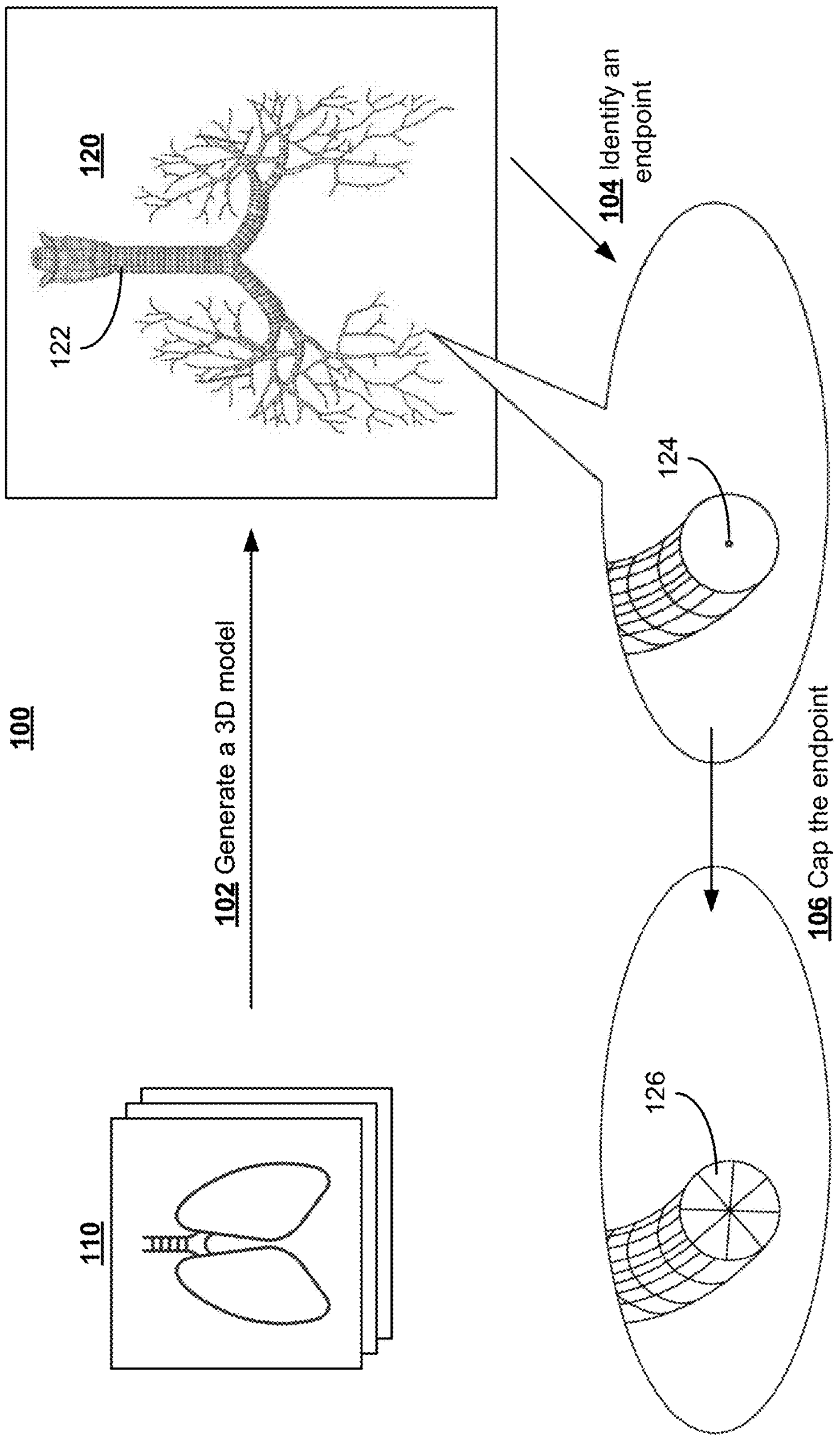
FIG. 1 illustrates a method of generating a 3D model of a human respiratory tract, according to an exemplary embodiment.

Referring generally to the FIGURES, described herein are systems and methods for modeling a human respiratory tract. Human respiratory tracts may vary greatly. Because of this variability, there are many scenarios where a "generic" 3D model of a human respiratory tract (e.g., a 3D model of a human respiratory tract that is not specific to a person/application it is being used for, etc.) may be poorly suited. For example, a drug dosage for an inhaled drug may vary greatly depending on the specific characteristics of an individual's respiratory tract. Therefore, it may be useful to create custom 3D models of a human respiratory tract to facilitate determining drug dosing. However, conventional systems and methods for creating 3D models of a human respiratory tract may require substantial human input, thereby making the use of custom 3D models of a human respiratory tract infeasible. For example, creating a custom 3D model of a human respiratory tract may require a person skilled in 3D modeling software to manually generate a 3D model based on images of a human respiratory tract. Manually generating a 3D model based on images may be time consuming, expensive, and/or prone to error (e.g., inaccurate modeling due to human error in the modeling process, etc.). Therefore, use of custom 3D models of a human respiratory tract may be infeasible in many scenarios. Moreover, there are features of the human respiratory tract that may be difficult (e.g., time consuming, require high levels of 3D modeling skill, etc.) to 3D model. For example, a 3D model of a human respiratory tract may have a number of outlets (e.g., openings, etc.) that must be capped in order to use the 3D model (e.g., thereby creating a sealed 3D volume). A 3D model of a human respiratory tract may have $2^n$+I such outlets, where n is a number of bronchi generations and I varies based on the inclusion/exclusion of upper respiratory cavities (e.g., nasal cavities, oral cavities, etc.). For example, a 3D model of a human respiratory tract including the $12^{th}$ generation of bronchi may include over 4,000 outlets (e.g., openings, etc.) that must be manually capped by a skilled 3D modeler with advanced knowledge of respiratory anatomy in order to make the 3D model usable (e.g., for computational fluid and particle dynamics (CFPD) simulations, etc.). These challenges may be multiplied at scale. For example, during drug development/drug trials it may be useful to generate a number of custom 3D models of the human respiratory tract corresponding to different patient populations (e.g., young patients, old patients, overweight patients, chronic smokers, scuba divers, etc.) having respiratory tracts with different characteristics (e.g., trachea diameter, lung volume, bronchi length, bronchi branching angle, etc.). However, generating a number of custom 3D models of the human respiratory system may be prohibitively time consuming and/or expensive.

Therefore, there is a need for systems and methods to generate custom 3D models of a human respiratory tract without a skilled 3D modeler. Systems and methods of the present disclosure may facilitate automatically generating custom 3D models of human respiratory tracts based on images such as computed tomography (CT) scan images. Systems and methods of the present disclosure may improve upon conventional systems and methods by automating the process of generating custom 3D models of the human respiratory tract, thereby saving time and money and reducing modeling error. For example, systems and methods of the present disclosure may facilitate automatically identifying and capping endpoints within a 3D model of a human respiratory tract to produce a sealed 3D volume that is suitable for various applications.

Referring now to FIG. 1, method 100 for generating a 3D model of a human respiratory tract is shown, according to an exemplary embodiment. In various embodiments, method 100 includes receiving a number of images 110. Images 110 may be and/or include CT scan images (e.g., volumetric CT scans, etc.). For example, images 110 may include images represented in a DICOM or NIfTI file format. Additionally or alternatively, images 110 may be and/or include images represented in any other file format (e.g., JPEG, TIFF, GIF, PNG, etc.). In some embodiments, method 100 includes receiving a 3D model (e.g., a 3D model of at least a portion of a human respiratory tract represented in a STL file format, etc.). Images 110 may include/depict at least a portion of a human respiratory tract. For example, a first number of images 110 may be CT scan images of an upper respiratory tract (e.g., a CT scan image depicting a trachea, pharynx, sinuses, oral cavity, and/or nasal cavity of an individual, etc.) and a second number of images 110 may be CT scan images of a lower respiratory tract (e.g., a CT scan image depicting a trachea and/or bronchi of an individual, etc.). In some embodiments, images 110 include multiple images of a single individual (e.g., where each image depicts a different angle and/or field of view, etc.).

At step 102, method 100 may include generating 3D model 120 based on images 110. 3D model 120 may include at least a portion of a human respiratory tract (e.g., shown as structure 122). For example, 3D model 120 may be and/or include a 3D model of an upper respiratory tract. As another example, 3D model 120 may be and/or include a 3D model of a lower respiratory tract. It should be understood that while FIG. 1 is illustrated in relation to a lower respiratory tract, method 100 is usable to generate a 3D model of any portion of a human respiratory tract, including a complete respiratory tract (e.g., a single 3D model including an upper respiratory tract merged with a lower respiratory tract, etc.). In some embodiments, step 102 includes executing a computer-implemented algorithm such as NASAL-Geom. Additionally or alternatively, step 102 may include executing a neural network trained on a dataset including medical imaging data. For example, step 102 may include feeding images 110 into a 3D U-Net Segmentation neural network trained on CT scan images from the EXACT'09 dataset (e.g., volumetric chest CT scans, etc.). In some embodiments, step 102 includes executing morphological-based algorithms. For example, step 102 may include executing NASAL-Geom. In some embodiments, step 102 includes segmenting/parameterizing the human respiratory tract (e.g., to identify and/or characterize different anatomical structures, etc.). For example, step 102 may include labeling a number of anatomical structures within images 110 and/or 3D model 120 (e.g., using a Random Forest for feature identification and/or kernelized k-means for clustering human respiratory tract geometries, etc.).

In some embodiments, step 102 includes one or more pre-processing and/or post-processing steps. For example, step 102 may include applying a filter to images 110 (e.g., a smoothing filter, a threshold filter, a contrast filter, etc.), performing an operation on images 110 (e.g., a binary dilation operation, a binary erosion operation, Laplacian digging, etc.), and/or removing a background from images 110. As another example, step 102 may include modifying 3D model 120 to increase a number/density of polygons within 3D model 120 and/or applying a filter to 3D model 120 (e.g., applying a Taubin filter to smooth the geometry of 3D model 120 while retaining finer bronchial structures, etc.). In various embodiments, a smoothing filter is applied to preserve the geometrical structures of a mesh of 3D model 120. Pre-processing and/or post-processing may be important for ensuring that 3D model is usable in CFPD simulations. For example, smoothing 3D model 120 may facilitate removing artifacts (e.g., such as sharp wall edges, etc.) that may lead to numerical inaccuracies during CFPD simulation. As another example, remeshing (e.g., modifying 3D model 120 to increase/decrease a number of polygons, etc.) may prevent geometric degradation of 3D model 120 that may result from a smoothing filter, thereby increasing an accuracy of 3D model 120 (e.g., especially in relation to small bronchial structures that may be greatly affected by a smoothing filter, etc.). In various embodiments, remeshing improves a quality of the polygons within the mesh. In some embodiments, step 102 includes merging two or more 3D models to generate 3D model 120. For example, step 102 may include generating a first 3D model of an upper respiratory tract, generating a second 3D model of a lower respiratory tract, and combining the first 3D model and the second 3D model to generate 3D model 120. Generating 3D model 120 is discussed in greater detail below with reference to FIG. 2.

At step 104, method 100 may include identifying endpoint 124. Endpoint 124 may correspond to an endpoint within 3D model 120 (e.g., an inlet/outlet of a human respiratory tract represented by 3D model 120, etc.). For example, endpoint 124 may be an endpoint of a bronchi. In some embodiments, step 104 includes identifying a number of endpoints. In various embodiments, step 104 includes automatically identifying endpoint 124 by identifying a centerline (e.g., a representation of a central flow path within the airway geometry, a center of the tubular structure, etc.) associated with structure 122 and identifying an endpoint of the centerline as endpoint 124. For example, step 104 may include computing a minimal cost path through a lumen of structure 122 to determine the centerline associated with structure 122. In some embodiments, step 104 includes using Dijkstra's algorithm. In some embodiments, step 104 includes generating a Voronoi Diagram and identifying the centerline based on the Voronoi Diagram. Additionally or alternatively, step 104 may include performing the Fast Marching Method (FMM). Identifying endpoint 124 is discussed in greater detail below with reference to FIG. 4.

At step 106, method 100 may include capping endpoint 124. In various embodiments, step 106 includes generating a cap (e.g., a 3D model of a shape, etc.), positioning/orienting the cap at endpoint 124, and/or merging the cap with 3D model 120. In various embodiments, the result of step 106 is a sealed 3D volume usable for CFPD simulations. Capping endpoint 124 is discussed in greater detail below with reference to FIG. 5.

In various embodiments, steps 104-106 are repeated for every inlet/outlet of 3D model 120. For example, method 100 may include identifying and capping every endpoint (e.g., inlet/outlet) corresponding to structure 122 such that method 100 produces a sealed 3D volume usable in CFPD simulations. In various embodiments, method 100 results in a sealed 3D volume that is usable to generate patient-specific particle deposition profiles. In various embodiments, method 100 may be performed partially or wholly by a computer. For example, method 100 may be implemented on a computer and may generate a sealed 3D volume with little to no human intervention.

Figure 2:
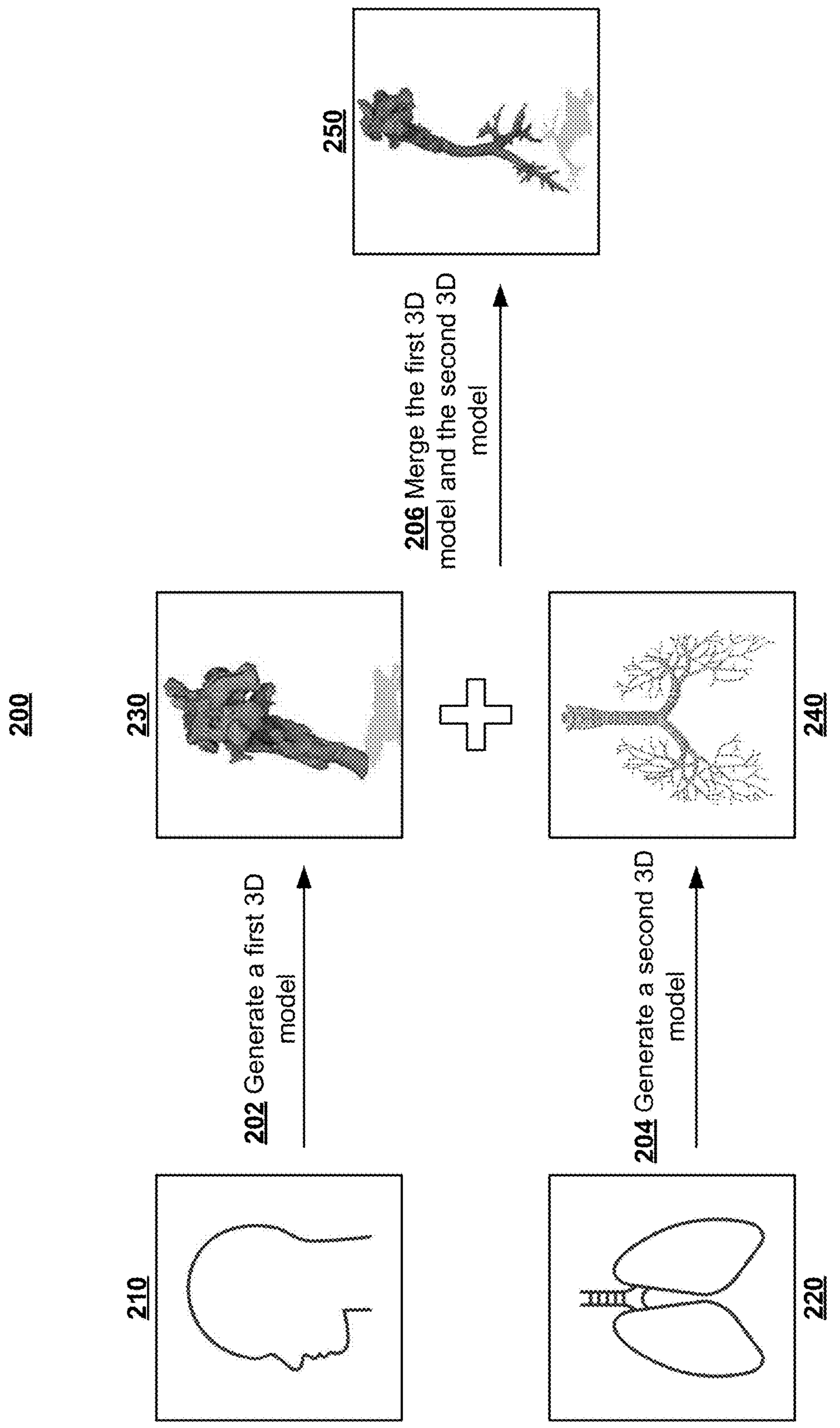
FIG. 2 illustrates another method of generating a 3D model of a human respiratory tract, according to an exemplary embodiment.

Referring now to FIG. 2, method 200 for generating a 3D model of a human respiratory tract is shown, according to an exemplary embodiment. In various embodiments, method 200 illustrates an exemplary method of performing step 102 in method 100. Method 200 may include receiving first image 210 and/or second image 220. First image 210 and/or second image 220 may be the same as and/or similar to images 110. For example, first image 210 may be a CT scan (e.g., a number of images depicting different planes of a human body, etc.) of an upper respiratory tract and second image 220 may be a CT scan of a lower respiratory tract. In various embodiments, first image 210 and second image 220 include overlap. For example, first image 210 may depict a portion of a trachea and second image 220 may depict the same portion of trachea. It should be understood that while first image 210 and second image 220 are illustrated as a single image, first image 210 and/or second image 220 may include any number of images (e.g., a number of images each corresponding to a different plane/slice of a human body, etc.).

At step 202, method 200 may include generating first 3D model 230 based on first image 210. Step 202 may include executing a computer-implemented algorithm such as NASAL-Geom. In various embodiments, step 202 includes generating first 3D model 230 such that it includes specific anatomical structures relevant for CFPD simulation. For example, first 3D model 230 may include nasal and oral cavities and the sinuses. Additionally or alternatively, step 202 may include generating first 3D model such that it excludes specific structures (e.g., disconnected/small-volume bodies, etc.).

At step 204, method 200 may include generating second 3D model 240 based on second image 220. Step 204 may include executing a neural network trained on a dataset including medical imaging data. For example, step 204 may include generating second 3D model 240 by using second image 220 as an input for a 3D U-Net Segmentation neural network trained on CT scan images from the EXACT'09 dataset. In some embodiments, step 204 includes parameterizing second 3D model 240. For example, step 204 may include determining (i) a length of a trachea, (ii) an average diameter of a trachea, (iii) a G0-to-G1 branching angle, and/or (iv) an internal volume of second 3D model 240. Second 3D model 240 may have various resolutions based on a resolution of second image 220. For example, second 3D model 240 may include generation zero through generation 23 of the human respiratory tract. As another example, second 3D model 240 may include generation zero (G0) through generation 16 (G16) of the human respiratory tract. Generation zero may correspond to the trachea, generation one may correspond to the primary bronchi, generation two may correspond to the secondary bronchi, generation three may correspond to tertiary bronchi, generation four may correspond to the small bronchi, generation five may correspond to the bronchioles, generations six-sixteen may correspond to the terminal bronchioles, generations 17-19 may correspond to the respiratory bronchioles, and/or generation 23 may correspond to the alveolar sacs. In various embodiment, steps 202-204 includes one or more pre/post-processing steps (e.g., remeshing, filtering, etc.).

At step 206, method 200 may include merging first 3D model 230 and second 3D model 240 to form combined 3D model 250. In various embodiments, step 206 includes merging first 3D model 230 and second 3D model 240 at an overlapping point. For example, first 3D model 230 may include a portion of trachea and second 3D model 240 may include the same portion of trachea (e.g., an overlapping portion of trachea) and step 206 may include merging first 3D model 230 and second 3D model 240 at the overlapping portion of trachea. In some embodiments, step 206 includes (i) determining a first tangent vector corresponding to an endpoint in first 3D model 230 (e.g., where the first tangent vector represents a direction of airflow at that point, tangent to a centerline of first 3D model 230 at the endpoint, etc.), (ii) determining a second tangent vector corresponding to an endpoint in second 3D model 240, (iii) positioning first 3D model 230 and second 3D model 240 such that the first tangent vector is the opposite of the second tangent vector and/or the endpoint in first 3D model 230 is positioned at the same point as the endpoint in second 3D model 240, and/or (iv) executing a Boolean difference operation to merge a mesh structure of first 3D model 230 with a mesh structure of second 3D model 240. In various embodiments, combined 3D model 250 is a sealed 3D volume (e.g., a watertight model) usable in CFPD simulations. For example, combined 3D model 250 may be used to generate a CFPD deposition profile using OpenFOAM and/or StarCCM+. A 3D model may be watertight if its boundary forms a closed, continuous, and orientable 2-manifold, where every edge is shared by exactly two adjacent faces, and no holes or open edges exist on the surface.

Figure 3:
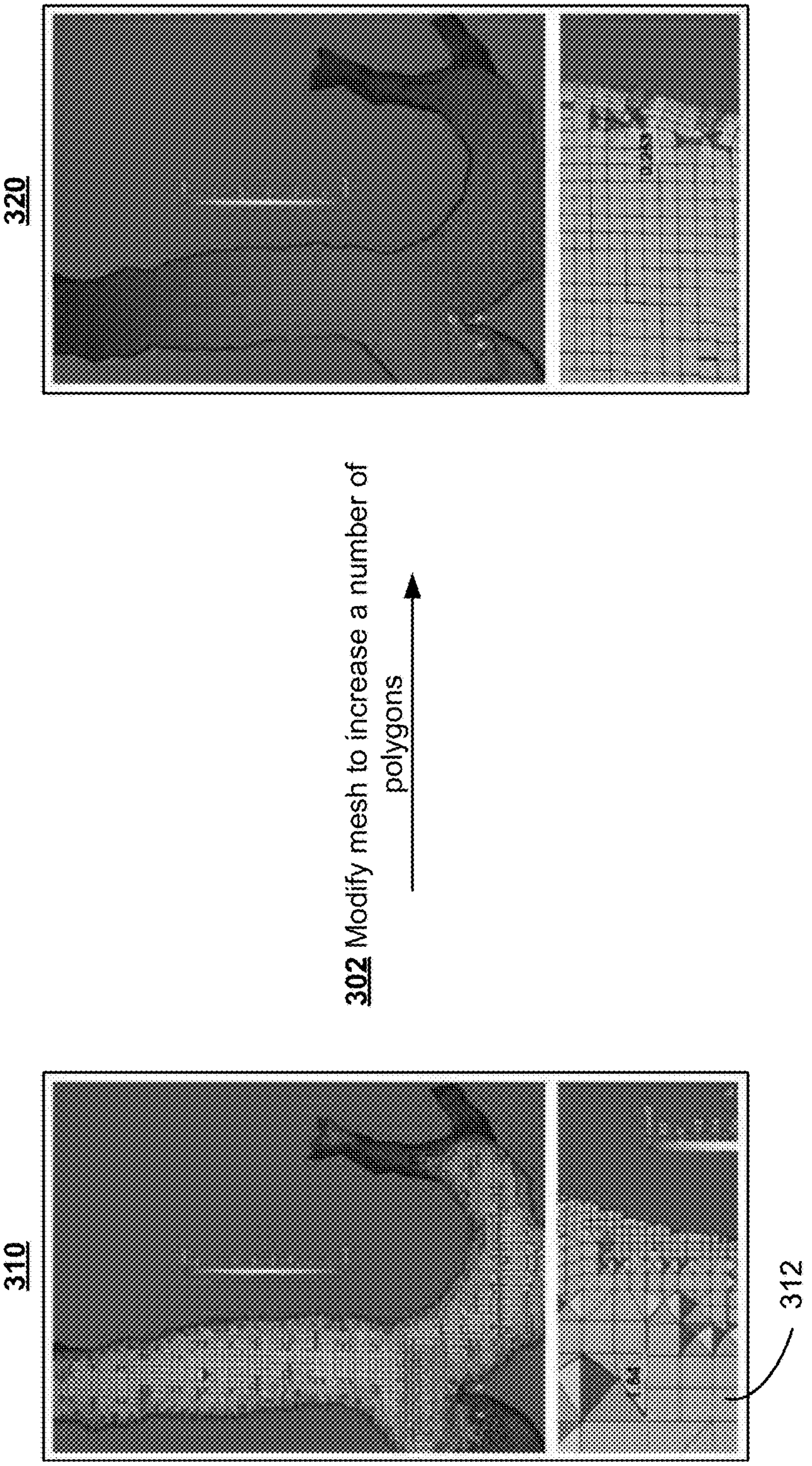
FIG. 3 illustrates a method of modifying a mesh of a 3D model of a human respiratory tract, according to an exemplary embodiment.

Referring now to FIG. 3, method 300 for modifying a mesh of a 3D model of a human respiratory tract is shown, according to an exemplary embodiment. In various embodiments, step 102 in method 100 includes performing method 300. Method 300 may include modifying first 3D model 310 to generate second 3D model 320. First 3D model 310 and/or second 3D model 320 may be the same as and/or similar to 3D model 120, first 3D model 230, second 3D model 240, and/or combined 3D model 250. For example, first 3D model 310 and second 3D model 320 may represent a human respiratory tract. First 3D model 310 and second 3D model 320 may include and/or be made up of a number of polygons (shown as polygons 312). At step 302, method 300 may include modifying a mesh of first 3D model 310 to increase a number of polygons. In various embodiments, second 3D model 320 includes a greater number of polygons 312 than first 3D model 310. For example, first 3D model 310 may include N polygons 312 and second 3D model 320 may include 4N polygons 312. In various embodiments, method 300 represents a method of "remeshing" (e.g., modifying a mesh of a 3D model) that is used to preserve a geometry of a 3D model by preventing geometric degradation as a result of applying a smoothing filter to the 3D model.

Figure 4:
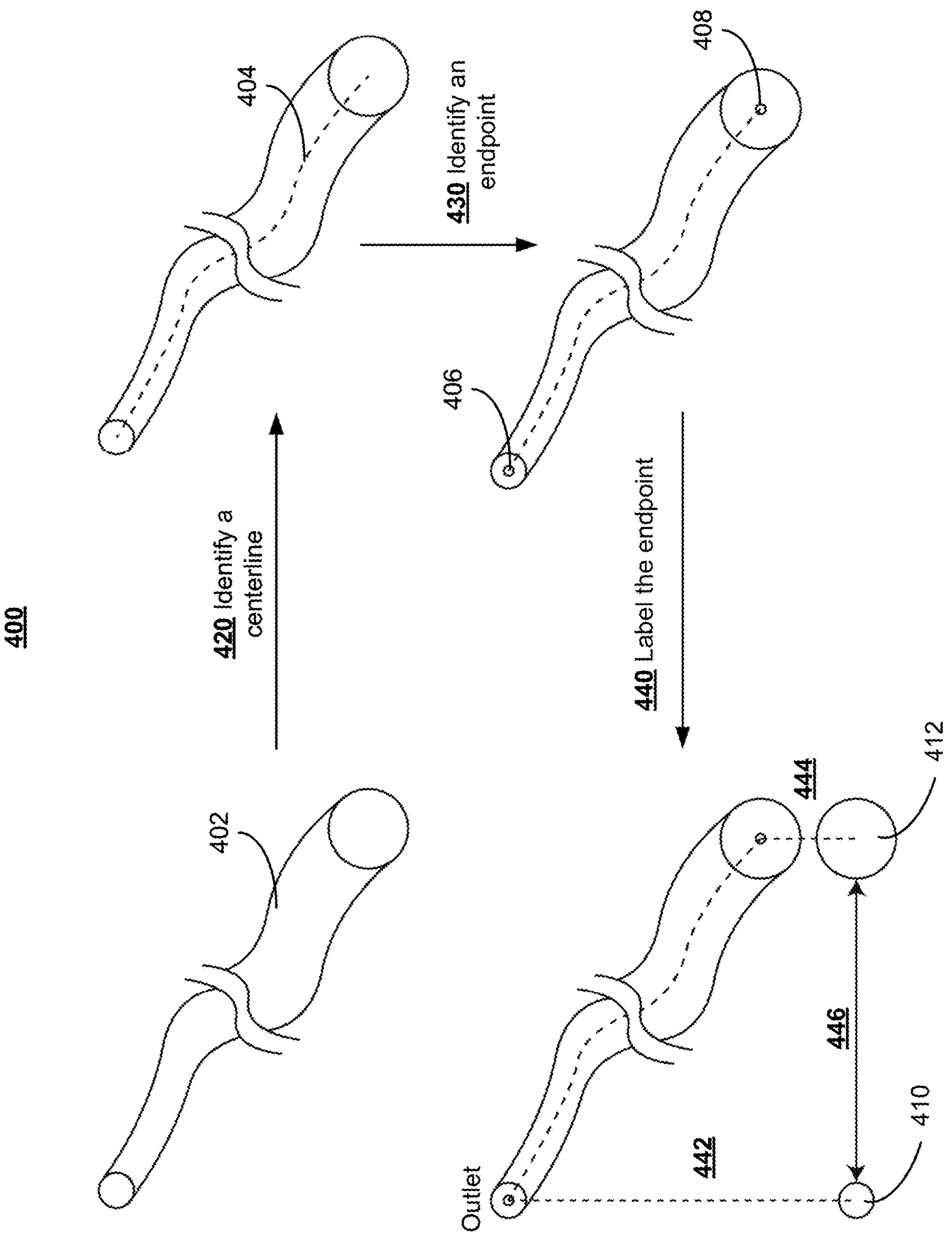
FIG. 4 illustrates a method of identifying an endpoint of a human respiratory tract within a 3D model, according to an exemplary embodiment.

Referring now to FIG. 4, method 400 for identifying an endpoint of a human respiratory tract within a 3D model is shown, according to an exemplary embodiment. In various embodiments, method 400 illustrates an exemplary method of performing step 104 in method 100. At step 420, method 400 may include identifying centerline 404 of 3D model 402. Centerline 404 may correspond generally to a center of a tubular structure (e.g., a portion of a human respiratory tract). In some embodiments, centerline 404 is a weighted shortest path between two points where the path is restricted to traverse a Voronoi Diagram of the 3D model of the human respiratory tract (or portion thereof). The Voronoi Diagram may be a spatial framework defining the center of maximal inscribed spheres (e.g., the largest spheres that may fit within the 3D model of the human respiratory tract).

3D model 402 may be and/or include a 3D model of at least a portion of a human respiratory tract. In various embodiments, step 420 includes generating a distance map using a Fast-Marching Method and/or using Dijkstra's algorithm to extract centerline 404 from the distance map based on minimal cost paths. In various embodiments, centerline 404 is represented as one or more segments. For example, centerline 404 may be represented by 30 segments where each segment is a straight line. Additionally or alternatively, centerline 404 may be represented as a continuous line. For example, a first centerline may be continuous and a second centerline may be segmented. In various embodiments, each segment of centerline 404 includes two ends. Segmenting (i.e., determining the segments that make up centerline 404) may occur during generation of the 3D model (e.g., in step 102, etc.). Additionally or alternatively, segmenting may occur during identification of centerline 404.

At step 430, method 400 may include identifying an endpoint of centerline 404. For example, step 430 may include identifying first endpoint 406 and/or second endpoint 408. First endpoint 406 and/or second endpoint 408 may correspond to an inlet or an outlet of an airway represented by 3D model 402. In various embodiments, step 430 includes identifying an end of a segment of centerline 404 that is not connected to another segment. For example, step 430 may include identifying a segment of centerline 404 that is only connected to one other segment and then identifying an end of the identified segment that is not connected to another segment. At step 440, method 400 may include labeling the endpoint (e.g., first endpoint 406 and/or second endpoint 408). For example, step 420 may include labeling first endpoint 406 as an outlet. In various embodiments, step 440 includes (i) determining first cross-sectional area 410 of an airway structure of 3D model 402 at first endpoint 406 (shown as step 442), (ii) determining second cross-sectional area 412 of an airway structure of 3D model 402 at second endpoint 408 (shown as step 444), (iii) comparing first cross-sectional area 410 to the second cross-sectional area 412 (shown as step 446), and/or (iv) labeling first endpoint 406 and/or second endpoint 408 based on the comparison. For example, step 440 may include labeling the endpoint associated with the smaller cross-sectional area as an outlet. In some embodiments, step 440 includes comparing a number of cross-sectional areas (e.g., comparing the cross-sectional area associated with every endpoint associated with a 3D model of a human respiratory tract, etc.). For example, step 440 may include comparing a cross-sectional area associated with every endpoint and labeling the endpoint associated with the largest cross-sectional area as an inlet (e.g., trachea) and all the other endpoints as outlets (e.g., terminal bronchioles). In some embodiments, step 440 include slicing a geometry of 3D model 402 perpendicular to centerline 404 to produce a cross-sectional plane (e.g., slice) and computing an area of the slice.

Figure 5:
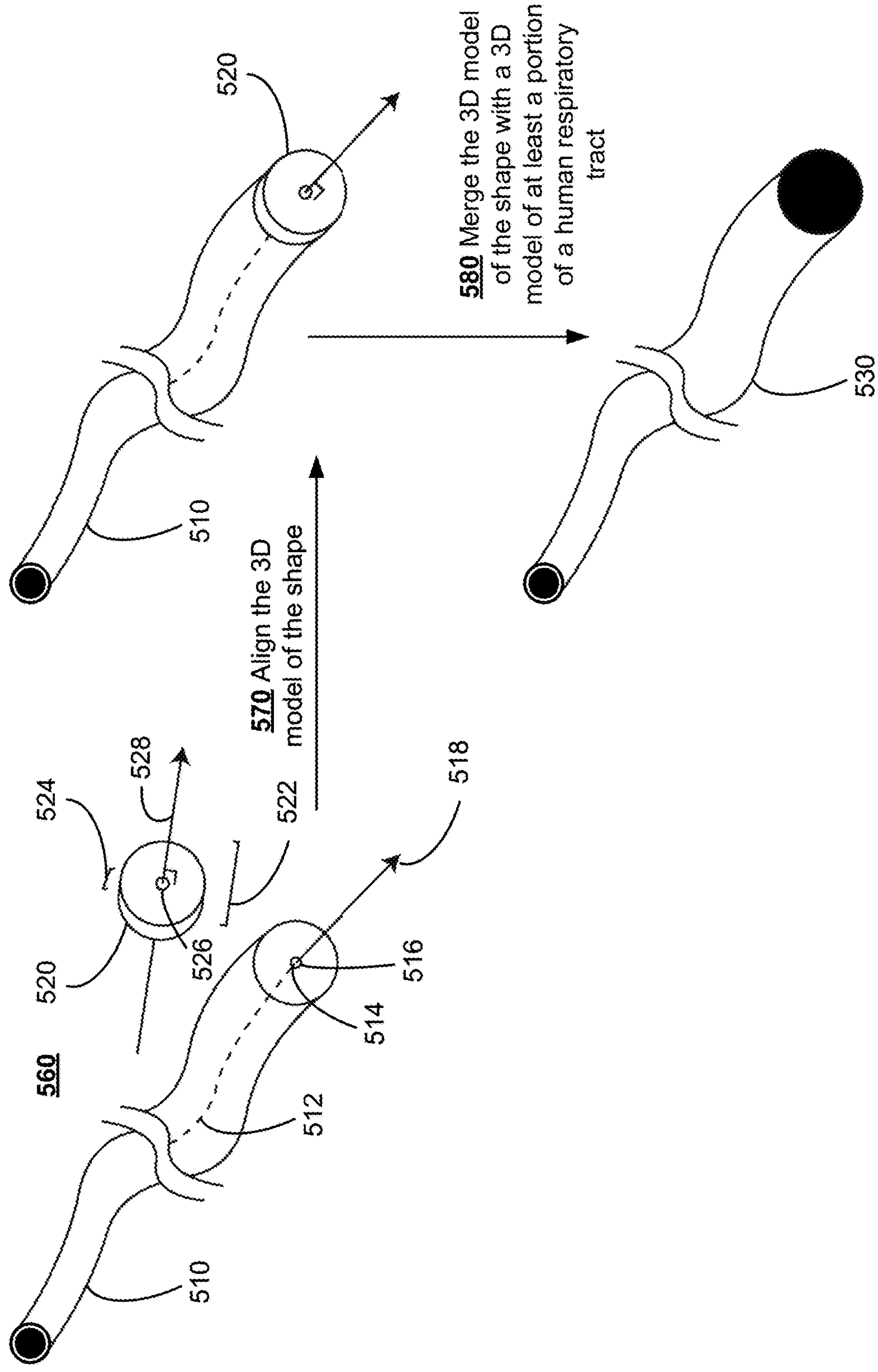
FIG. 5 illustrates a method of capping an endpoint of a human respiratory tract within a 3D model, according to an exemplary embodiment.

Referring now to FIG. 5, method 500 for capping an endpoint of a human respiratory tract within a 3D model is shown, according to an exemplary embodiment. In various embodiments, method 500 illustrates an exemplary method of performing step 106 in method 100. At step 560, method 500 may include generating a 3D model of a shape (shown as cap 520). In various embodiments, cap 520 is a disc. Cap 520 may have diameter 522, width 524, center 526, and normal vector 528 (e.g., where normal vector 528 is perpendicular to a surface of cap 520, etc.).

At step 570, method 500 may include aligning cap 520 to 3D model 510. 3D model 510 may be and/or include a 3D model of at least a portion of a human respiratory tract. In various embodiments, there may be a centerline (shown as centerline 512) associated with a structure of 3D model 510. For example, centerline 512 may be a centerline of an airway such as a bronchus represented by 3D model 510. Centerline 512 may have endpoint 514 and tangent vector 518. Tangent vector 518 may represent a tangent of centerline 512 at endpoint 514. In various embodiments, tangent vector 518 represents the direction of airflow within the structure at endpoint 514. In various embodiments, step 570 includes positioning center 526 at a center (shown as center 516) of a cross-sectional plane of the structure of the 3D model 510 taken at endpoint 514. Additionally or alternatively, step 570 may include aligning normal vector 528 with tangent vector 518 (e.g., such that $\vec{n}=\vec{t}$). In various embodiments, step 570 includes positioning cap 520 such that a capping surface (e.g., a portion of cap 520 that will be used to seal an opening in the structure of 3D model 510, etc.) is orthogonal to the direction of airflow at endpoint 514.

At step 580, method 500 may include merging cap 520 with 3D model 510. Step 580 may include performing a Boolean difference operation to merge a mesh of cap 520 with a mesh of 3D model 510. Step 580 may result in a sealed 3D volume usable in CFPD simulations (shown as sealed 3D model 530).

Sealed 3D model 530 may be useful in many scenarios. For example, researchers may use sealed 3D model 530 to determine respiratory therapies. This may be particularly important for respiratory conditions such as asthma and chronic obstructive pulmonary disease (COPD), the treatment for which requires drugs to reach specific regions on the lungs. Therefore, individualized CFPD simulations may be useful for developing inhaler designs and dosing strategies that disperse and deposit particles in patient-specific airway geometries (e.g., thereby enhancing treatment effectiveness, reducing side effects, and improving patient outcomes, etc.). As another example, public health officials may use sealed 3D model 530 to analyze the health effects of inhaling radioactive particles (e.g., in the event of a radioactive leak, etc.). As another example, regulators may use sealed 3D model 530 to assess occupational hazards associated with airborne contaminants. In many scenarios sealed 3D model 530 offers benefits over conventional systems and methods by facilitating individualized modeling and simulation (e.g., for precision health risk assessment, determining individualized drug dosing, etc.). For example, conventional systems and methods may not account for complex airflow patterns and particle dynamics with a patient's airway, thereby leading to inaccuracies. Conversely, sealed 3D model 530 enables individualized CFPD simulations that may provide greater accuracy. In various embodiments, systems and methods of the present disclosure enable large-scale population studies that were previously impractical due to resource constraints. For example, researchers may use the systems and methods of the present disclosure to generate customized 3D models of patients' respiratory tracts at scale for use in studies (e.g., where this was previously impractical due to the time and cost associated with hiring a skilled 3D modeler to create custom 3D models of the patients' respiratory tracts). In various embodiments, sealed 3D model 530 may be used to generate subject-specific particle deposition profiles (e.g., via CFPD simulations).

Figure 6:
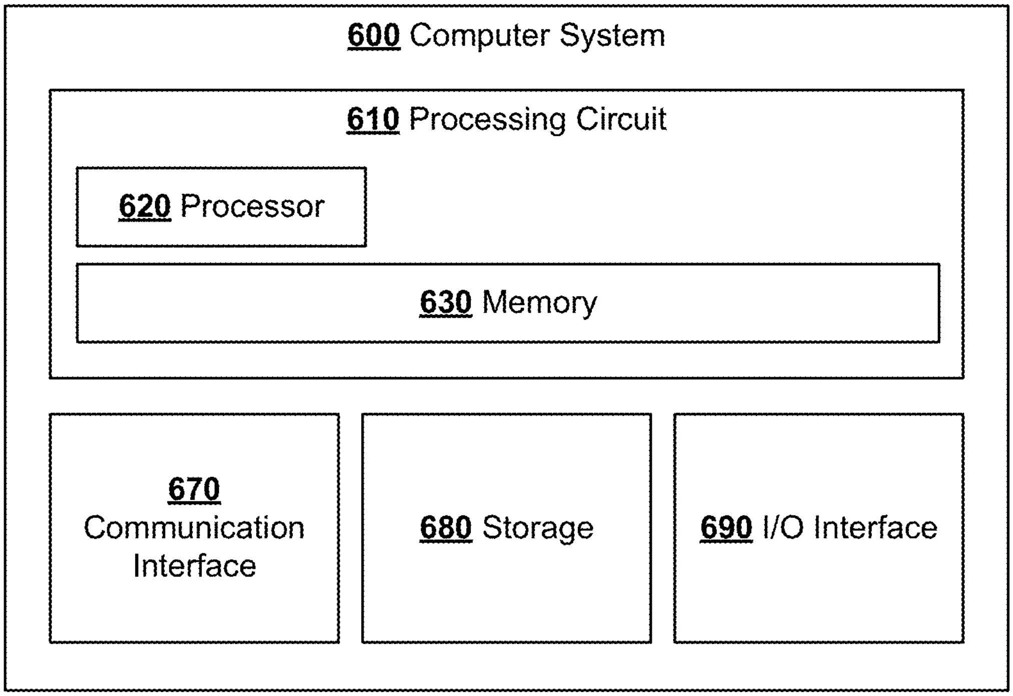
FIG. 6 is a block diagram of a computer system, according to an exemplary embodiment.

Referring now to FIG. 6, computer system 600 is shown, according to an exemplary embodiment. In various embodiments, computer system 600 implements/performs the various methods/functions/steps/algorithms described herein (e.g., method 100, method 200, method 300, method 400, and/or method 500, etc.). Computer system 600 may include processing circuit 610, communication interface 670, storage 680, and/or I/O interface 690. Processing circuit 610 may include processor 620 and/or memory 630. Processor 620 may be a general purpose or specific purpose processor, an application specific integrated circuit (ASIC), one or more field programmable gate arrays (FPGAs), a group of processing components, or other suitable processing components. Processor 620 is configured to execute computer code or instructions stored in memory 630 or received from other computer readable media (e.g., CDROM, network storage, a remote server, etc.). Memory 630 may include one or more devices (e.g., memory units, memory devices, storage devices, and/or other computer-readable media) for storing data and/or computer code for completing and/or facilitating the various processes described in the present disclosure. Memory 630 may include random access memory (RAM), read-only memory (ROM), hard drive storage, temporary storage, non-volatile memory, flash memory, optical memory, or any other suitable memory for storing software objects and/or computer instructions. Memory 630 may include database components, object code components, script components, or any other type of information structure for supporting the various activities and information structures described in the present disclosure. Memory 630 may be communicably connected to processor 620 via processing circuit 610 and may include computer code for executing (e.g., by processor 620) one or more of the processes described herein. For example, memory 630 may have instructions stored thereon that, when executed by processor 620, cause processing circuit 610 to (i) receive a number of CT scan images, (ii) generate, based on the number of CT scan images, a 3D model of at least a portion of the human respiratory tract, and/or (iii) automatically (e.g., with little to no human intervention) cap an uncapped endpoint of the human respiratory tract within the 3D model.

Communication interface 670 may facilitate communication with one or more systems/devices. For example, computer system 600 may communicate with an electronic health records (EHR) system to receive a number of CT scan images via communication interface 670. Communication interface 670 may be or include wired or wireless communications interfaces (e.g., jacks, antennas, transmitters, receivers, transceivers, wire terminals, etc.) for conducting data communications with external systems or devices. In various embodiments, communications via communication interface 670 is direct (e.g., local wired or wireless communications). Additionally or alternatively, communications via communication interface 670 may utilize a network (e.g., a WAN, the Internet, a cellular network, etc.).

Storage 680 may store data/information associated with modeling a human respiratory tract. For example, storage 680 may store a number of CT scan images. As another example, storage 680 may store a 3D model of a human respiratory tract. Storage 680 may be and/or include one or more memory devices (e.g., hard drive storage, temporary storage, non-volatile memory, flash memory, optical memory, and/or any other suitable memory device).

I/O interface 690 may facilitate input/output operations. For example, I/O interface 690 may include a display capable of presenting information from a user and an interface capable of receiving input from the user. In some embodiments, I/O interface 690 includes a display device configured to present a 3D model of a human respiratory tract to a user. I/O interface 690 may include hardware and/or software components. For example, I/O interface 690 may include a physical input device (e.g., a mouse, a keyboard, a touchscreen device, etc.) and software to enable the physical input device to communicate with computer system 600 (e.g., firmware, drivers, etc.).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term “client or “server” include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

What is claimed is:

1. A method for modeling a human respiratory tract, comprising:

- receiving a plurality of images, wherein each of the plurality of images comprise at least a portion of the human respiratory tract;
- generating, based on the plurality of images, a 3D model of at least the portion of the human respiratory tract, wherein the 3D model of at least the portion of the human respiratory tract comprises an uncapped endpoint; and
- automatically capping the uncapped endpoint within the 3D model of at least the portion of the human respiratory tract by:
  - identifying, using a computer-implemented algorithm, the uncapped endpoint within the 3D model of at least the portion of the human respiratory tract;
  - generating a 3D model of a shape;
  - aligning the 3D model of the shape with the uncapped endpoint by positioning a center of the 3D model of the shape at a centroid corresponding to the uncapped endpoint; and
  - merging the 3D model of the shape with the 3D model of at least the portion of the human respiratory tract.

2. The method of claim 1, wherein the plurality of images comprise a computed tomography (CT) scan or a magnetic resonance imaging (MRI) image.

3. The method of claim 1, wherein generating the 3D model of at least the portion of the human respiratory tract comprises:

generating a first 3D model of an upper respiratory tract comprising a nasal cavity and an oral cavity;

generating a second 3D model of a lower respiratory tract comprising a trachea; and merging the first 3D model and the second 3D model to form the 3D model of at least the portion of the human respiratory tract.

4. The method of claim 3, wherein the second 3D model of the lower respiratory tract comprises a fifth generation of bronchi.

5. The method of claim 1, wherein generating the 3D model of at least the portion of the human respiratory tract comprises (i) executing a neural network trained on a plurality of volumetric chest CT scans or (ii) executing morphological-based algorithms.

6. The method of claim 1, further comprising parameterizing the 3D model of at least the portion of the human respiratory tract to identify at least two of (i) a length of a trachea, (ii) an average diameter of the trachea, (iii) a G0-to-G1 branching angle, or (iv) a volume of the 3D model of at least the portion of the human respiratory tract.

7. The method of claim 1, further comprising:

modifying a mesh of the 3D model of at least the portion of the human respiratory tract to increase or decrease a number of polygons in the mesh; and applying a smoothing filter to the mesh.

8. The method of claim 1, wherein identifying the uncapped endpoint within the 3D model of at least the portion of the human respiratory tract comprises:

identifying, based on the 3D model of at least the portion of the human respiratory tract, a centerline associated with a structure of the human respiratory tract; and identifying an endpoint of the centerline.

9. The method of claim 8, wherein identifying the endpoint of the centerline comprises:

identifying a first endpoint of the centerline;

identifying a second endpoint of the centerline;

determining a first cross-sectional area associated with the structure of the human respiratory tract within the 3D model of at least the portion of the human respiratory tract at the first endpoint;

determining a second cross-sectional area associated with the structure of the human respiratory tract within the 3D model of at least the portion of the human respiratory tract at the second endpoint; and labeling the first endpoint or the second endpoint based on comparing the first cross-sectional area to the second cross-sectional area.

10. The method of claim 1, wherein automatically capping the uncapped endpoint within the 3D model of at least the portion of the human respiratory tract comprises producing a sealed 3D volume representing at least the portion of the human respiratory tract.

11. A system for modeling a human respiratory tract, comprising:

a processing circuit comprising a processor and memory, the memory having instructions stored thereon that, when executed by the processor, cause the processing circuit to:

receive a plurality of images, wherein each of the plurality of images comprise at least a portion of the human respiratory tract;

generate, based on the plurality of images, a 3D model of at least the portion of the human respiratory tract;

automatically identify, using a computer-implemented algorithm, an uncapped endpoint of the human respiratory tract within the 3D model of at least the portion of the human respiratory tract; and automatically cap the uncapped endpoint within the 3D model of at least the portion of the human respiratory tract by (i) positioning a center of an object at a centroid corresponding to the uncapped endpoint and (ii) merging the object with the 3D model of at least the portion of the human respiratory tract.

12. The system of claim 11, wherein the plurality of images comprise a computed tomography (CT) scan or a magnetic resonance imaging (MRI) image.

13. The system of claim 11, wherein generating the 3D model of at least the portion of the human respiratory tract comprises:

generating a first 3D model of an upper respiratory tract comprising a nasal cavity and an oral cavity;

generating a second 3D model of a lower respiratory tract comprising a trachea; and merging the first 3D model and the second 3D model to form the 3D model of at least the portion of the human respiratory tract.

14. The system of claim 13, wherein the second 3D model of the lower respiratory tract comprises a fifth generation of bronchi.

15. The system of claim 11, wherein generating the 3D model of at least the portion of the human respiratory tract comprises (i) executing a neural network trained on a plurality of volumetric chest CT scans or (ii) executing morphological-based algorithms.

16. The system of claim 11, wherein the instructions further cause the processing circuit to parameterize the 3D model of at least the portion of the human respiratory tract to identify at least two of (i) a length of a trachea, (ii) an average diameter of the trachea, (iii) a G0-to-G1 branching angle, or (iv) a volume of the 3D model of at least the portion of the human respiratory tract.

17. The system of claim 11, wherein the instructions further cause the processing circuit to:

modify a mesh of the 3D model of at least the portion of the human respiratory tract to increase a number of polygons in the mesh; and apply a smoothing filter to the mesh.

18. The system of claim 11, wherein automatically identifying the uncapped endpoint of the human respiratory tract within the 3D model of at least the portion of the human respiratory tract comprises:

identifying, based on the 3D model of at least the portion of the human respiratory tract, a centerline associated with a structure of the human respiratory tract;

identifying a first endpoint of the centerline;

identifying a second endpoint of the centerline;

determining a first cross-sectional area associated with the structure of the human respiratory tract within the 3D model of at least the portion of the human respiratory tract at the first endpoint;

determining a second cross-sectional area associated with the structure of the human respiratory tract within the 3D model of at least the portion of the human respiratory tract at the second endpoint; and labeling the first endpoint or the second endpoint based on comparing the first cross-sectional area to the second cross-sectional area.

19. A non-transitory computer-readable storage medium having instructions stored thereon that, when executed by a processor, cause the processor to:

receive a plurality of images comprising a computed tomography (CT) scan or a magnetic resonance imaging (MRI) image, wherein each of the plurality of images comprise at least a portion of a human respiratory tract;

generating, based on the plurality of images, a 3D model of at least the portion of the human respiratory tract, wherein the 3D model of at least the portion of the human respiratory tract comprises an uncapped endpoint of the human respiratory tract; and automatically capping the uncapped endpoint within the 3D model of at least the portion of the human respiratory tract by:

identifying, using a computer-implemented algorithm, the uncapped endpoint of the human respiratory tract within the 3D model of at least the portion of the human respiratory tract by:

identifying, based on the 3D model of at least the portion of the human respiratory tract, a centerline associated with a structure of the human respiratory tract using at least one of a Voronoi Diagram or a Fast Marching Method (FMM); and identifying an endpoint of the centerline as the uncapped endpoint of the human respiratory tract;

generating a 3D model of a shape;

aligning the 3D model of the shape with the uncapped endpoint of the human respiratory tract by positioning a center of the 3D model of the shape at a centroid corresponding to the uncapped endpoint of the human respiratory tract; and merging the 3D model of the shape with the 3D model of at least the portion of the human respiratory tract to produce a sealed 3D volume representing at least the portion of the human respiratory tract.

* * * * *